G. A. LYON.
ADJUSTABLE AUTOMOBILE BUFFER.
APPLICATION FILED FEB. 7, 1918.
1,325,733. Patented Dec. 23, 1919.
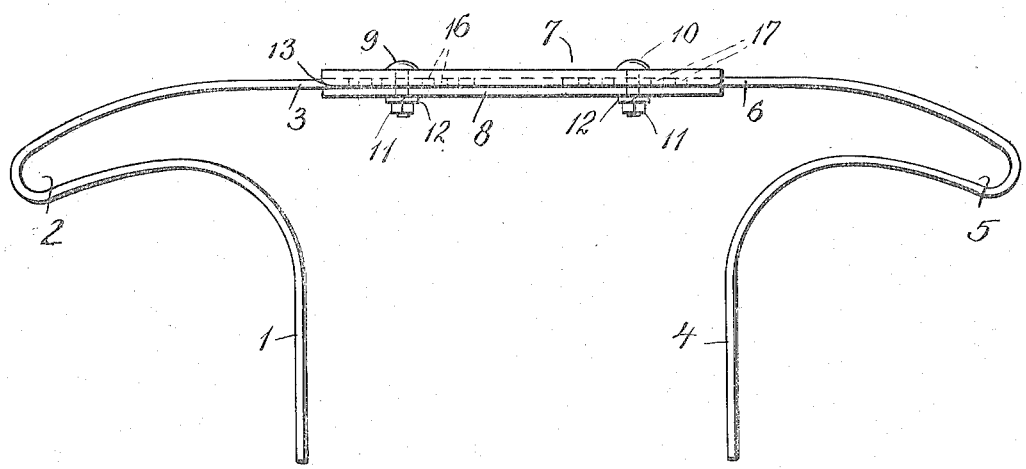
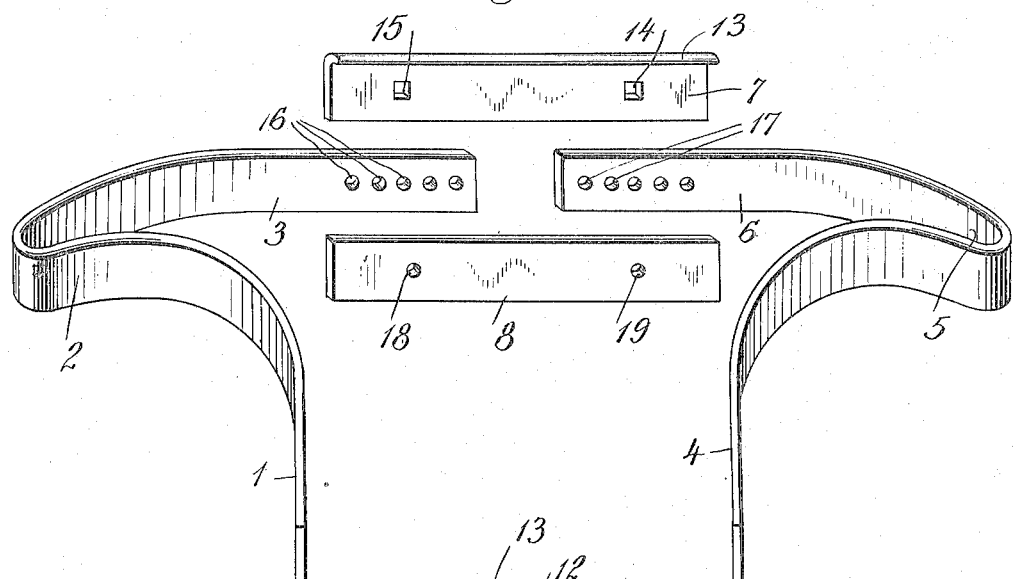
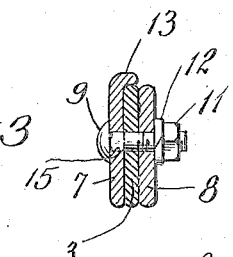
Inventor
George Albert Lyon
By his Attorney
Harry L. Duncan

UNITED STATES PATENT OFFICE.

GEORGE ALBERT LYON, OF PHILADELPHIA, PENNSYLVANIA.

ADJUSTABLE AUTOMOBILE-BUFFER.

1,325,733.     Specification of Letters Patent.     Patented Dec. 23, 1919.

Application filed February 7, 1918. Serial No. 215,761.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Adjustable Automobile-Buffers, of which the following is a specification, taken in connection with the accompanying drawing.

This invention relates to resilient automobile buffers of the general type covered by the Lyon Patent 1,198,246, of September 12, 1916. The buffer may comprise two resilient strips of spring steel having attaching members of any suitable shape to be secured to the automobile frame or other parts of a vehicle and also having transversely extending impact receiving members preferably having their adjacent inner ends approaching each other and substantially in line and also having intermediate resilient curved portions, such as one end loops. The impact receiving members or portions of the spring strips may be conveniently connected by being clamped or bolted to one or more resilient strip reinforcing members arranged on one or both sides of the impact receiving members to rigidly connect the same and one or more of these reinforcing members may advantageously be formed with an alining flange projecting over and more or less engaging the vertical edges of the impact receiving members so as to impart additional vertical rigidity to the connection. The reinforcing and connecting members may, if desired, be bolted to the coöperating impact receiving members of the buffer and connecting bolts may pass through suitable openings, such as holes or slots in the reinforcing members and through other openings, such, for instance, as a series of adjusting connecting holes in the ends of the impact receiving members so that the width of the buffer and the distance between its attaching members can be adjusted to fit automobiles having frame members located at different distances apart.

In the accompanying drawing showing in a somewhat diagrammatic way an illustrative embodiment of the invention, Figure 1 is a top view of the buffer.

Fig. 2 is a diagrammatic perspective view showing the different parts in separated position; and Fig. 3 is a transverse sectional view through one of the connecting bolts in Fig. 1.

The buffer may be composed of a number of strips of resilient material, such as tempered spring steel, and it is desirable to have these strips at least throughout such portions as are subject to considerable vertical bending forces given a considerably greater vertical width than thickness so as to make them vertically rigid while resiliently yielding to a much greater extent in horizontal directions to absorb collision impacts. Two such strips are shown in Figs. 1 and 2 as having practically similar contour and comprising attaching members of any suitable shape and construction to be connected to the automobile frame or other vehicle part. One of these strips may as indicated comprise the attaching member 1 and the transversely extending impact receiving member 3 which may be connected by any suitable curved resilient portion, such, for example, as the interposed open end loop 2 which is adapted to extend outward into protective position adjacent the automobile wheel. The other similar spring strip member comprises the attaching member 4, the resilient end loop 5 and the impact receiving member 6 which in the assembled bumper is preferably arranged substantially in line with the other impact receiving member and adjustably supported in connection therewith.

For this purpose one or more reinforcing connecting members preferably of resilient character may be clamped or bolted by any suitable connecting devices to the coöperating inner ends of the impact receiving members. These reinforcing members may be formed of spring steel strip and may be arranged on one or both sides of the impact receiving members so as to simultaneously connect the same and form a multiple thickness reinforced front portion of the buffer which may advantageously extend substantially throughout the distance between the attaching members or automobile frame members to which they are connected. As indicated in the drawing resilient reinforcing members 7, 8 which may be of spring steel strip may be securely connected or clamped on both sides of the impact receiving members as by suitable connecting devices or bolts 9, 10 which may extend through square or polygonal connecting openings or holes 14, 15 in the front reinforcing member and if desired be provided with square or polygonal shank portions 15 to engage these connecting holes and thereby prevent undesirable rotation of the bolts with respect to this front member. The connecting bolts may extend through the connecting holes 18, 19 in the back reinforcing member 8 and also where the adjustment of the buffer members is to be secured in this way through suitable adjusting connecting openings in the impact receiving members allowing their lateral adjustment, such, for example, as by having these connecting bolts extend through any one of the series of adjusting connecting holes 16, 17 in one or both of the interposed impact receiving members of the main buffer strips. In this way sufficient relative adjustment of the width of the buffer and its attaching members can be secured so as to cover the extreme range of width in the usual commercial automobile frames and at the same time by having a single hole in both the front and back reinforcing members within which the connecting bolt fits rather closely, the parts are more or less prevented from moving or working loose under running conditions. As indicated in Figs. 1 and 3 the connecting bolts may with advantage be formed with rounded heads so as to give a neat and finished appearance in connection with the front reinforcing member which like the bolt heads may be nickel-plated if desired. One or more nuts 11 may be arranged on each of the bolts and lock washers or other retaining devices 12 may be employed, if desired. The connection between the coöperating buffer members may be given additional vertical rigidity by forming a vertical alining flange, such as 13, on one or more of the reinforcing members so as to overlap the adjacent portions of the impact receiving members and be tightly held in connection therewith by the connecting bolts or devices so as to minimize or prevent undesirable vertical movement between these parts. Also by arranging this alining flange at the top of the front reinforcing member it may serve to substantially conceal the opening between the inner ends of the impact receiving members of the buffer. These reinforcing members may like the other buffer strips be formed with the usual rounded edges which give a more pleasing appearance to the device and the alining flange may of course be formed by bending over one edge of the corresponding reinforcing member before it is hardened and tempered.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims.

I claim—

1. The automobile buffer comprising two similar resilient strips each having a rearwardly extending attaching member, an intermediate laterally extending loop member and a front impact receiving member having considerably greater vertical width than thickness and provided with connecting openings, resilient strip front reinforcing connecting members to be secured on both sides of said impact receiving members to connect the same and hold them in substantially horizontal alinement with each other and formed with connecting holes, and connecting bolts having square shanks passing through said holes in said reinforcing and impact receiving members to clamp the same together, one of said reinforcing members being formed with an alining flange adapted to coöperate with the upper edges of said impact receiving members to hold them in substantial vertical alinement and substantially conceal the space between them when said buffer is mounted on an automobile.

2. The automobile buffer comprising two similar resilient strips each having a rearwardly extending attaching member, an intermediate laterally extending loop member and a front impact receiving member having considerably greater vertical width than thickness and resilient strip front reinforcing connecting members to be secured on both sides of said impact receiving members to connect the same and hold them in substantial horizontal alinement with each other and formed with connecting holes, and connecting devices coöperating with said reinforcing and impact receiving members to clamp the same together, one of said reinforcing members being formed with an alining flange adapted to coöperate with the edges of said impact receiving members to hold them in substantial vertical alinement.

3. The automobile buffer comprising two resilient strips each having an attaching member, a laterally extending loop member and an impact receiving member having considerably greater vertical width than thickness and said impact receiving members being provided with a series of adjusting connecting openings, resilient strip front reinforcing connecting members to be secured alongside said impact receiving members to adjustably connect the same and adapted to extend across the impact receiving portion of the buffer substantially throughout the distance between the attaching members and formed with connecting openings, and connecting bolts passing through said openings in said reinforcing and impact receiving members to clamp the same together, one of said reinforcing members being formed with an alining flange adapted to coöperate with the edges of said impact receiving members to hold them in substantial vertical alinement.

4. The automobile buffer comprising two resilient strips each having an attaching member and an impact receiving member having considerably greater vertical width than thickness and said impact receiving members being provided with a series of adjusting connecting openings, resilient strip front reinforcing connecting members to be secured alongside said impact receiving members to adjustably connect the same and adapted to extend across the impact receiving portion of the buffer substantially throughout the distance between the attaching members and formed with connecting openings, and connecting bolts passing through said openings in said reinforcing and impact receiving members to clamp the same together.

5. The automobile buffer comprising two resilient strips each having an attaching member and an impact receiving member having considerably greater vertical width than thickness, resilient strip front reinforcing connecting members to be secured alongside said impact receiving members to connect the same, one of said reinforcing members being formed with an alining flange adapted to coöperate with the edges of said impact receiving members to hold them in substantial vertical alinement.

6. The automobile buffer comprising two resilient strips each having a rearwardly extending attaching member, an intermediate laterally extending loop member and a front impact receiving member provided with a series of adjusting connecting holes, a resilient strip front reinforcing member adapted to extend across the front of the buffer substantially throughout the distance between the attaching members and formed with connecting holes, and connecting bolts passing through said holes in said reinforcing and impact receiving members to clamp the same together, said reinforcing member being formed with an alining flange adapted to coöperate with the edges of said impact receiving members to hold them in substantial vertical alinement.

7. The automobile buffer comprising two resilient strips each having a rearwardly extending attaching member, and a front impact receiving member, a resilient strip front reinforcing member adapted to extend across the front of the buffer substantially throughout the distance between the attaching members, and connecting devices coöperating with said reinforcing and impact receiving members to clamp the same together, said reinforcing member being formed with an alining flange adapted to coöperate with the edges of said impact receiving members to hold them in substantial vertical alinement.

8. The automobile buffer comprising two spring steel strips each having an attaching member and an impact receiving member said impact receiving members being provided with a series of adjusting connecting openings, a resilient strip front reinforcing member adapted to extend alongside the impact receiving members of the buffer substantially throughout the distance between the attaching members and formed with connecting openings, connecting bolts passing through said openings in said reinforcing and impact receiving members to clamp the same together, said reinforcing member being formed with alining portions adapted to coöperate with the edges of said impact receiving members to hold them in substantial vertical alinement.

9. The automobile buffer comprising two spring steel strips each having an attaching member and an impact receiving member said impact receiving members being provided with a series of adjusting connecting openings, a resilient strip front reinforcing member adapted to extend alongside the impact receiving members of the buffer and connecting devices coöperating with said reinforcing and impact receiving members to clamp the same together, said reinforcing member being formed with alining portions adapted to coöperate with the edges of said impact receiving members to hold them in substantial vertical alinement.

GEORGE ALBERT LYON.

Witnesses:
HARRY L. DUNCAN,
JESSIE B. KAY.